United States Patent [19]
Watanabe

[11] 3,874,536
[45] Apr. 1, 1975

[54] SPARE TIRE HOLDER FOR AN AUTOMOBILE

[76] Inventor: Yoshio Watanabe, 4-3 Yokowari, 2-chome, Fuji, Japan

[22] Filed: July 25, 1973

[21] Appl. No.: 382,322

[52] U.S. Cl................ 214/451, 214/331, 224/42.23
[51] Int. Cl............................................ B62d 43/00
[58] Field of Search .......... 214/331, 450, 451, 452, 214/453, 454; 224/42.23; 74/803, 804, 805

[56] References Cited
UNITED STATES PATENTS

| | | |
|---|---|---|
| 1,571,457 | 2/1926 | Orr ........................................ 74/805 |
| 1,759,062 | 5/1930 | Neighbour ............................. 74/805 |
| 3,372,821 | 3/1968 | Podhajsky ............................. 214/451 |

*Primary Examiner*—Albert J. Makay
*Assistant Examiner*—Lawrence J. Oresky
*Attorney, Agent, or Firm*—William Anthony Drucker

[57] ABSTRACT

A spare tire holder device having a spare time thereon for an automobile or the like is tightened to the vehicle chassis by a chain between the chassis and the holder which is wound by rotation of a planet gear engaged with a link gear, and thereby pulsating motion is avoided during winding and a secure seating of the holder is obtained.

1 Claim, 3 Drawing Figures

SPARE TIRE HOLDER FOR AN AUTOMOBILE

This invention relates to a spare tire holder for an automobile, wherein the pulsating motion of the chain for winding up the holder is prevented through the use of a planet gear.

Firstly, the construction of a spare tire holder for an automobile according to this invention will be described with reference to the accompanying drawings.

Figure 1:
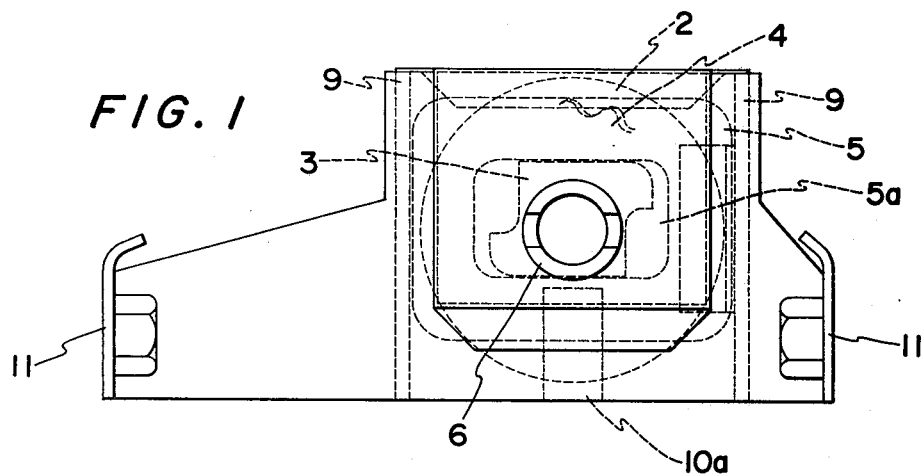
FIG. 1 is an elevational view of the spare tire holder according to this invention.
Figure 2:
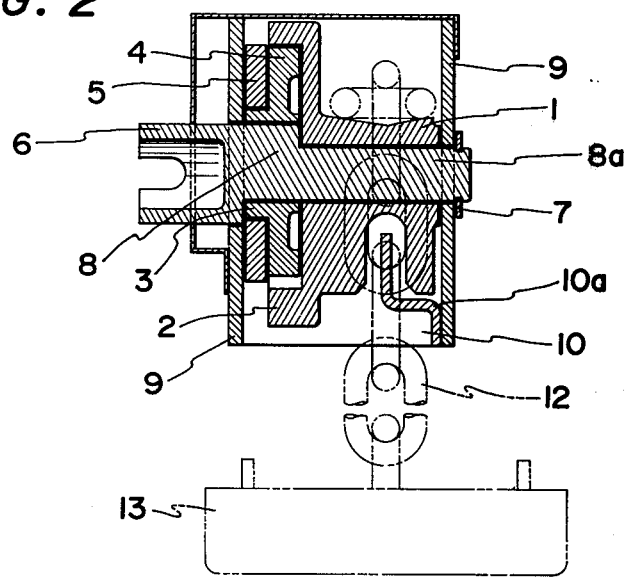
FIG. 2 is a vertical sectional view of the principal portion of the holder shown in FIG. 1.

Now, the present invention will be described in detail.

The first object of this invention is to provide a chain wheel 1 formed integrally with a link gear 2, and a planet gear 4 engaged with the link gear 2 so that the chain wheel is caused to rotate simultaneously with the rotation of the planet gear in engagement with the link gear.

The second object of this invention is to avoid the pulsating motion of the chain while the chain is being wound up, by inserting a square shaft 3 formed integrally with, and projecting from the planet gear 4 into the square aperture 5a of a frame plate 5 so as to make the shaft to slide in the right and the left directions, said frame plate 5 being disposed to slide upwardly and downwardly along the inner wall of a casing 9.

And furthermore, the third object of this invention is to move a tire holder 13 upwardly and downwardly by winding the chain up and off by rotating an input shaft 6, the eccentric shaft 8 of which, with its extension 8a, is inserted from outside the casing through the planet gear 4 as well as the link gear 2.

Next, the structural details of the present invention will be described further with reference to the accompanying drawings.

Shown in the drawings, 1 is a chain wheel formed integrally with the link gear 2, and 3 is a square shaft formed integrally with, and projecting from the front surface of the planet gear 4 that is engaging with the link gear 2. This square shaft 3 is inserted into the square aperture 5a of the frame plate 5 so as to be able to slide in the right and the left directions.

6 is the input shaft formed integrally with the eccentric shaft 8 and inserted into the square shaft 3. The extension 8a of the eccentric shaft 8 is inserted into the chain wheel 1. 7 iss a washer for preventing the eccentric shaft 8 from escaping out rearwardly. 10 is a chain groove of the casing for receiving the chain 12 when it is wound up by the chain wheel 1, and 10 a a chain guide, 11 part of the casing to be mounted on the chassis, and 13 a tire holder.

The input shaft 6 is formed integrally with the eccentric shaft 8 and its extension 8a, and the eccentric shaft rotates within the square shaft 3 with its extension 8a as being the central axle of rotation.

Figure 3:
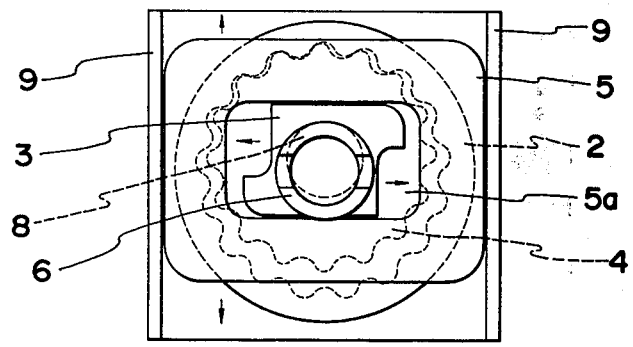
FIG. 3 is an elevational view of the same principal portion shown in FIG. 2.

The square shaft 3 slides in the right and the left directions within the square aperture 5a of the frame plate 5 through the rotation fof the eccentric shaft 8, while the frame plate 5 slides upwardly and downwardly along the inner wall of the casing 9 (in the directions indicated by arrows in FIG. 3).

Therefore, the intermittent movement, namely the pulsating motion of winding up the chain is avoided.

As the extension 8a of the input shaft is inserted into the central hole of the link gear 2 the planet gear 4 makes an eccentric rotation in engagement with the link gear 2 when the input shaft is rotated. And since the chain wheel 1 which is formed integrally with the link gear rotates with the rotation of the link gear 2, the chain is wound up and off so as to move the tire holder 13 upwardly and downwardly.

In this instance, because of the square shaft 3 being formed integrally with the planet gear 4 and inserted into the square aperture 5a of the frame plate 5 the square shaft 3 floats over the limited range of space within the square aperture, and the frame plate 5, while controlling this floating motion, slides upwardly and downwardly along the inner wall of the casing 9.

By means of the movement described above, the link gear 2 and the planet gear 4 are rotated always at a constant speed in engagement with each other so as to drive the chain wheel smoothly, resulting in that any pulsating motion in winding up the chain is avoided.

Since the conventional device of this kind lacks such a combined construction of the square shaft and the frame plate as described above there can be gaps wherein the link gear 2 and the planet gear 4 do not engage with each other so that the transmission of the rotation is interrupted temporarily; that is, both gears make the gearing transmission during a certain period of time, but it may happen that no transmission is made after the lapse of a certain time period during the operation. At this moment, the winding-up of the chain is stopped, and when the gearing transmission is again commenced the chain winding is also recommenced, which will however be followed again by a non-operating moment.

Thus, the gearing transmission of both gears stops momentarily so that the chain is wound up with the pulsating motion, presenting the drawback that the spare tire holding plate may not be held closely to the bottom surface of the casing of the spare tire holder. This can even cause that the spare tire held on the tire holder may fall down, the spare tire holder being jolted during the running of the automobile.

Accordingly, the present invention has given a satisfactory solution of the disadvantages of pulsating motion of the spare tire holding device.

Thus, the construction of the present invention is provided with the features of preventing the pulsating motion of the conventional gear mechanism for the spare tire holding device and can hold the tire holder closely to the bottom surface of the casing, enabling also to hold the tire securely and safely.

What is claimed is:

1. A spare tire holder device comprising:
   a. a bracket means for the detachable mounting of a spare tire wheel;
   b. a winch mounted on a vehicle chassis;
   c. a chain or the like connected to said winch and said bracket means to pull on and hold said bracket means with said spare tire wheel thereon; wherein said winch comprises:
   d. a gearing transmission comprising:
   e. a winding wheel about which said chain or the like is wound thus pulling said bracket means; said winding wheel being integral with a link gear engaged with a planet gear, said being integral with a drive shaft which slides over a limited range in an elongate rectangular aperature to accommodate pulsation caused by the winding or unwinding of said chain or like because of the uneven contact surface of the chain or the like and the winding surface.

* * * * *